Patented June 16, 1942

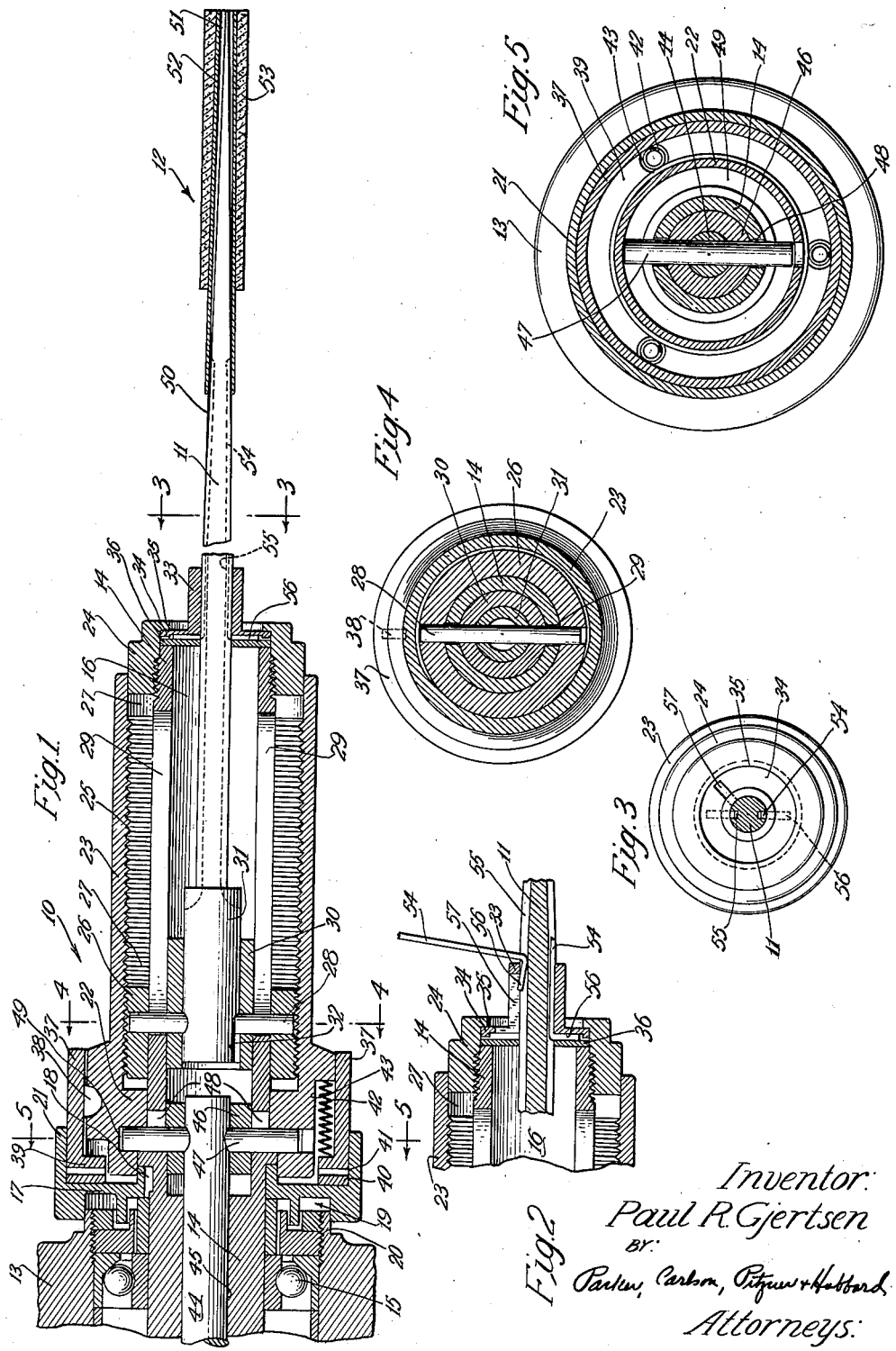

2,286,360

UNITED STATES PATENT OFFICE 2,286,360

TOOL SUPPORTING MEANS

Paul R. Gjertsen, Detroit, Mich., assignor to Ex-Cell-O Corporation, Detroit, Mich., a corporation of Michigan Application April 27, 1939, Serial No. 270,274

9 Claims. (Cl. 51—184.3)

The invention relates to tool supporting means and more particularly to means for operatively securing a rotary tool, such as an abrading or lapping tool, in a machine. Structures embodying the invention are especially well adapted for supporting abrading tools of the character covered by my copending applications Serial No. 264,706, filed March 29, 1939, and Serial No. 188,593, filed February 4, 1938, in abrading machines of the type covered by my copending application Serial No. 270,273, filed April 27, 1939.

An object of the invention is to provide a new and improved tool support embodying means for conveniently assembling a tool therewith and for accurately adjusting the tool to a desired operating condition.

Another object is to provide a novel device of this character for drivingly supporting an abrading or lapping tool having a mandrel axially adjustable to vary the radial dimension of abrading means associated therewith, which device includes means for effecting such axial adjustment of the mandrel initially and between fixed limits during operation of the tool.

Other objects and advantages will become apparent in the following description and from the accompanying drawing in which:

Figure 1 is an axial sectional view of a tool support embodying the features of the invention.

Fig. 2 is a fragmentary sectional view showing a detail of the assembly of the abrading devices with the tool support.

Figs. 3, 4 and 5 are transverse sectional views of the tool support and are taken respectively along the lines 3—3, 4—4 and 5—5 of Fig. 1.

While the invention is susceptible of various modifications and alternative constructions, I have shown in the drawing and will herein describe in detail the preferred embodiment, but it is to be understood that I do not thereby intend to limit the invention to the specific form disclosed, but intend to cover all modifications and alternative constructions falling within the spirit and scope of the invention as expressed in the appended claims.

The present invention has been illustrated as being embodied in a tool support which is operatively associated with an abrading tool of the type shown and described in my copending applications aforesaid. Such tools include a driving mandrel having abrading devices associated therewith for radial movement to expand and contract the effective diameter of the tool upon relative axial movement of the mandrel and abrading devices. As will become evident, however, the invention includes features that may be used in connection with abrading tools of other than this particular type.

In the exemplary embodiment of the tool support which has been selected to illustrate the invention the numeral 10 designates generally a tool support which drivingly receives one end of a mandrel 11 having abrading devices 12 operatively associated with the outer or free end thereof. A bearing frame member 13 has the front end of a driven spindle 14 journalled therein by a bearing 15. The spindle extends through and a substantial distance beyond the bearing and its front end has an axial bore 16 therein. Encircling the spindle adjacent to the frame member is a radial plate 17 which is keyed, as at 18, to the spindle and is dust-sealed with respect to the frame member by an arrangement of interfitting flanges, generally indicated at 19, on the plate 17 and on an annular ring assembly 20 on the frame member adjoining the bearing 13. The radial plate has a forwardly extending concentric flange 21 at its periphery that encircles the enlarged end 22 of an elongated sleeve 23. The enlarged end of the sleeve is dimensioned to fit rotatably on the spindle and the sleeve beyond said end extends in radially spaced relation forwardly along the spindle nearly to the free end thereof. At its outer or free end, the sleeve rotatably encircles an adjacent portion of a clamping member or annulus 24 screw threaded on the end of the spindle. Internally the sleeve is provided with screw threads 25 for engagement by external screw threads on a ring nut 26 which is located in the space 27 between the spindle and sleeve and is slidably supported by the spindle. A pin 28, or the like, mounted by its ends in the nut, extends diametrically of the spindle through elongated, longitudinal slots 29 oppositely formed in the spindle and extending nearly to the free end thereof. The pin also extends through a collar 30 in the spindle bore 16 which is adapted to receive and support an enlarged head 31 on the inner end of the shank of the mandrel 11. A detachable connection, such as a bayonet slot 32 in the head 31 drivingly joins the mandrel to the pin 28. Bearing means for the mandrel at the front end of the spindle preferably comprises a bearing member 33 having a radial flange 34 arranged to be marginally bound between an annular lip 35 on the clamping member 24 and the end face of the spindle. A washer 36 is interposed between the spindle end and the flange 34 and as will be presently described the assembly of the bearing means and the washer in fixed relation to the spindle is employed to secure the abrading elements in position with respect to the mandrel and for longitudinal adjustment relative thereto.

The sleeve 23 serves as a position adjusting means for the abrading devices since rotation of the sleeve relative to the spindle will advance or retract the nut 26 axially, the nut being held against rotation with the sleeve by the engagement of the pin 28 in the spindle slots 29. Movement of the nut effects a corresponding axial movement of the mandrel.

To prevent self-adjustment of the nut 26 and associated parts by the driving movement of the spindle, frictional locking means between the sleeve 23 and the spindle or a part rotating therewith is provided. In this instance, a collar 37 surrounds the enlarged end 22 of the sleeve 23 and is keyed thereto as at 38 for relative movement only in an axial direction. The inner end of the collar is enclosed by the flange 21 on the radial plate 17 and the collar has a radial end flange 39 disposed in spaced opposition to the plate. The end face of the flange 39 is notched, serrated or otherwise appropriately fashioned for frictional engagement with similar configurations on the face of an annular member 40 fixed to the radial plate. The frictional engaging means is designated at 41 and is normally maintained by a series of springs 42, or the like, which are seated in bores 43 in the enlarged sleeve end 22 to bear against the end flange 39. Thus the frictional holding engagement 41 normally prevents rotation of the sleeve 23 relative to the spindle, yet this holding engagement may be readily overcome by a force exerted by the user to rotate the sleeve 23 and adjust the nut 26.

The present tool support includes means which may be actuated manually or automatically for effecting relative movement of the mandrel and abrading devices to produce an expanding radial adjustment of the abrading devices to size or a retraction thereof to permit insertion of the tool into or removal thereof from a bore in a work piece. To this end, a rod 44 is slidably and rotatably seated in an axial bore 45 formed in the spindle as a rearwardly extending, restricted continuation of the end bore 16. The front end of the rod extends into the bore 16 and is there supported by a sliding block 46. A radial pin 47 extends through oppositely located longitudinal slots 48 of limited length in the spindle and the pin ends extend into an annular groove 49 in the enlarged sleeve end 22. This connection permits the sleeve 23 and the associated parts connecting the mandrel therewith to be moved by the rod 44 axially relative to the spindle to the extent determined by the slots 48. Independent rotation of the sleeve 23 adjusts the nut 26 and fixes initially the position of minimum operating diameter of the abrading devices and the maximum diameter for any initial adjustment is determined by the limit of movement of the rod 44. The frictional engagement 41 which holds the sleeve against unintended movement is effective in any position of initial adjustment.

Reference to my copending applications aforesaid may be had for a complete explanation of the features of the abrading tool herein shown. However, a brief description of the salient structural characteristics of the tool will be given to facilitate an understanding of the operative association of the tool with the present tool support. The mandrel 11 is an elongated circular rod having the head 31 connected to its inner end and having oppositely disposed tapering wedge surfaces 50 at its free end. Each of the tapering surfaces has a longitudinally extending medial guide rib 51 thereon for engagement by a complementary groove formed in a sheet metal plate 52 constituting a holder or shoe to which an abrading element 53 is bonded or otherwise secured. Each plate and abrading element assembly forms an abrading device 12 so shaped that the active abrading surface is a longitudinal section of a cylinder and the mandrel abutting face lies on the plane of a chord of the cylinder angularly complemental to the taper of a wedge surface. Each abrading device is a segmental section of a cylinder that tapers from its outer to its inner ends in width and in thickness. The assembly of a pair of abrading devices on the mandrel provides an active abrading surface substantially in the form of a complete cylinder.

Extending rearwardly along the shank from each of the abrading devices is an adjustment control member 54 in the form of a wire secured to the end of the plate. The mandrel has longitudinally extending grooves 55 snugly to receive the wires and each wire has a right angular end portion 56 which forms the means for securing the abrading devices to the tool support and mandrel.

The assembly of the abrading devices with the tool support is best seen in Fig. 2. The mandrel bearing member 33 at the front end of the spindle has a longitudinal slot 57 therein extending from a point near to the outer end thereof through the length of the member and through the radial flange 34. This slot may by rotation of the bearing member be caused to register with a mandrel groove 55 to permit the angular end portion 56 on the wire to be passed through the mandrel groove beneath the unsevered end portion of the bearing member, as shown, and thence into the slot 57. Lengthwise movement of the abrading device rearwardly moves the wire end portion 56 through and past the radial flange 34 and rotation of the bearing member disposes the end portion between the flange and the washer 36. The second abrading device may be assembled in the same manner. Hence, when the parts are secured to the tool support between the spindle end and the clamping member, the abrading devices are firmly fixed in axial relation to the spindle in a manner that permits of relative adjusting movement between the mandrel and abrading devices.

It will be evident that as the rod 44 is advanced or retracted, a corresponding movement will be imparted to the mandrel 11 to effect relative movement between the abrading devices and the mandrel and radially expand or contract the abrading surfaces. The initial diameter of the abrading tool is determined by the setting of the nut 26 while the maximum diameter is limited by the extent of movement permitted the rod 44 by the slots 48. The assembly fixes the position of the abrading devices with respect to the end of the tool support and this position does not vary during the operation of the tool.

I claim as my invention:

1. A supporting device for an abrading tool having radially adjustable abrading elements and an associated member axially movable relatively to said elements for effecting such adjustments, said device comprising, in combination, a rotatable spindle, and means for connecting said member with said spindle for rotation therewith, means for adjusting the position of said connecting means axially of said spindle, and a sleeve relatively rotatable with respect to said spindle for adjustably shifting said adjusting means and said connecting means axially of said spindle, said sleeve also having limited axial movement relative to said spindle for shifting said connecting means with respect to an adjusted position thereof.

2. A tool support of the character described having, in combination, tool driving means arranged for connection with a tool, a driven rotatable member, means connecting said driving means for rotation with said driven member and for limited axial movement relative thereto, the connecting means including adjustable means for determining the initial position of said driving means relative to said driven member and means for otherwise shifting said connecting means axially from an adjusted position during operation of the support, and releasable means for maintaining the adjustable means against accidental adjusting movement.

3. A tool support having, in combination, a rotatable member provided with an axial end bore, a sleeve encircling said member, an adjusting nut encircling said member within said sleeve and having screw threaded engagement with said sleeve, means connecting said nut with a tool part disposed in said bore and including a rotatable driving connection between said nut and said member providing relative axial movement therebetween, means for shifting said sleeve and nut axially of said member for a limited distance, and releasable means for maintaining said sleeve against rotation relative to said member.

4. A tool support having, in combination, a rotatable member, a sleeve encircling said member, an adjusting nut encircling said member within said sleeve and having screw threaded engagement with said sleeve, means within said sleeve for securing a tool part to said nut, a rotatable driving connection between said nut and said member for driving the tool part so secured, said connection including means permitting relative axial movement of the connected parts, and releasable means yieldingly maintaining said sleeve against rotation relative to said member.

5. A tool support having, in combination, a rotatable member provided with an axial end bore, a sleeve rotatably encircling said member and axially movable relative thereto, means interposed between said sleeve and member having screw threaded engagement with said sleeve and being slidable with respect to said member, and means connecting the interposed means with a tool part disposed in said bore and providing an axially shiftable rotatable driving connection with said member.

6. A tool support having, in combination, a rotatable member having an axial end bore, a sleeve encircling said member and releasably connected thereto for rotation therewith and axial movement relative thereto, connecting means in said bore for engagement with the tool part, said connecting means being rotatable with said member and axially movable relative thereto, and a nut member engaging said connecting means and movable by rotation or axial movement of said sleeve relative to said member for effecting axial movement of said connecting means relative to said member.

7. In a tool support, the combination of a spindle having an axial end bore adapted to receive a tool mandrel, a pair of axially spaced radial members at the axially bored end of said spindle adapted to receive therebetween radially extending end portions on tool holders associated with said mandrel, and means for binding said radial members against said spindle to secure said end portions therebetween.

8. In a device for supporting a tool which embodies a rotatable driving mandrel having axial movement to adjust the operative relationship of cutting elements, the combination of a driven member having an axial end bore to receive the end of said mandrel, means for connecting said mandrel to said member for rotation therewith and for axial movement relative thereto, a sleeve encircling said member and movable relative thereto rotatably and axially, a nut engaging said sleeve and the connecting means for moving said connecting means axially upon rotation of said sleeve relative to said member and for moving said connecting means axially when said sleeve is shifted axially relative to said member, and means for restraining said sleeve against rotation relative to said member.

9. In a device for supporting a tool which embodies cutting elements and a rotatable driving mandrel having axial movement to adjust the operative relationship of said cutting elements, the combination of a driven member having an axial end bore to receive the end of said mandrel, means for connecting said mandrel to said member for rotation therewith and for axial movement relative thereto, a sleeve encircling said member and movable relative thereto rotatably and axially, a nut engaging said sleeve and the connecting means for moving said connecting means axially upon rotation of said sleeve relative to said member and for moving said connecting means axially when said sleeve is shifted axially relative to said member, means for restraining said sleeve against rotation relative to said member, and means for connecting said cutting elements to said member.

PAUL R. GJERTSEN.